United States Patent [19]

Jerman

[11] Patent Number: 4,869,103

[45] Date of Patent: Sep. 26, 1989

[54] WATER FLOW MEASURING AND DISPERSING DEVICE

[76] Inventor: James K. Jerman, 11 Bradshaw La., Northport, N.Y. 11768

[21] Appl. No.: 202,831

[22] Filed: Jun. 3, 1988

[51] Int. Cl.⁴ .......................................... G01F 15/00
[52] U.S. Cl. .................. 73/198; 239/428.5; 239/590
[58] Field of Search .............. 73/198, 861.52, 861.65; 239/428.5, 590, 590.5

[56] References Cited

U.S. PATENT DOCUMENTS

| | | |
|---|---|---|
| 852,581 | 5/1907 | Sanborn .......................... 73/861.63 |
| 1,276,732 | 8/1918 | Darley . |
| 2,372,606 | 3/1945 | Sammis . |
| 3,779,318 | 12/1973 | Livingston . |
| 3,831,448 | 8/1974 | Kors et al. . |
| 4,047,668 | 9/1977 | DeWeese et al. . |
| 4,343,435 | 8/1982 | Anderton et al. . |

Primary Examiner—Herbert Goldstein
Attorney, Agent, or Firm—Scully, Scott, Murphy & Presser

[57] ABSTRACT

A water flow measuring and dispersing device for measuring flow characteristics of a water stream from fire fighting equipment such as a hydrant or pump truck in which the device includes a funnel-shaped housing, a flow measuring meter and a dispersion element. The flow measuring meter is positioned in a neck portion of the housing which is of uniform diameter, and the housing tapers outwardly to a discharge portion having a diameter greater than the neck portion. The dispersion element consists of a crossbar and disc positioned normal to the water flow path in the discharge portion. Dispersion of the stream is enhanced by the infusion of air into the stream caused by the flow of water around the disc.

8 Claims, 2 Drawing Sheets

WATER FLOW MEASURING AND DISPERSING DEVICE

BACKGROUND OF THE INVENTION

1. Field of the Invention

The present invention relates to water flow measuring devices, and more particularly, to water flow measuring devices for use with fire-fighting equipment such as fire hydrants or firetruck pumps, where air is infused into the stream of water to disperse the stream to prevent damage to the surrounding environment due to the force of the water.

Water flow measuring and dispersing devices for measuring and dispersing the water flow of a fire hydrant are well known in the art. These devices generally include a pyramidal-shaped body provided with a measuring device such as a pitot tube or a manometer positioned in the water stream. Screens are provided to break up or cavitize the water stream to diffuse the stream over a greater area. The known devices generally spray the water without redirecting the stream.

2. Discussion of the Prior Art

In the prior art, various flow measuring devices and several dispersion or diffusion devices are disclosed. The particular types of flow measuring devices are, of course, conventional and are not of importance to this invention. The diffusion and measuring devices in the prior art, however, are subject to several disadvantages, which in most instances, lead to inaccurate measurements, which in turn may result in the diminished effectiveness of the hydrant or pumper truck which is subjected to the measurement procedure.

De Weese, et al., U.S. Pat. No. 4,047,668, discloses a water flow diffuser for use on a fire hydrant which incorporates a series of diffuser elements into a conical housing. The diffuser elements consist of a plurality of screens bolted or welded to the interior of the housing. The smaller end of the cone is opened towards the hydrant and is connected to the hydrant by a coupling section which is open to the atmosphere. The coupling section may be fitted with a measuring apparatus for measuring the flow rate of the water. Crossbars are also provided at the smaller end of the cone so that large objects, such as rocks, in the stream of water do not damage the screens, which diffuse and cavitate the water.

De Weese, et al. suffers from a typical but important disadvantage which results in inaccurate flow measurements. De Weese, et al. positions a measurement device in the coupling section, which is also conically shaped, and results in flow measurements being made at a point where the water stream has already expanded. The measurement is therefore inaccurate, and the pressure in the hydrant system cannot be properly and accurately determined. De Weese, et al. also suffers from the disadvantage that diffusion or dispersion of the water is caused by the screens, which serve to break up the stream. The result is that backpressure, especially if the conical housing of De Weese, et al. was to be completely enclosed, would also lead to inaccurate flow measurement.

Anderton, et al., U.S. Pat. No. 4,343,435, also discloses a fire hydrant diffuser device which has a flared rectangular or pyramidal shape and is provided with a pair of diffuser elements in stepped configuration which extend inwardly from the discharge end to meet at the center of the water stream. The overall cross-section of the diffuser elements forms a "V" shape. Anderton, et al., like De Weese, et al., also cavitates and disperses the water by breaking it up.

While Anderton, et al. does not disclose a measuring device for measuring the flow of water through the device, it is apparent that if one were provided, Anderton, et al. would suffer the same disadvantages as De Weese, et al. Anderton, et al.'s device has an expanding cross-section from the neck coupling at the hydrant, and accordingly a flow measuring device would have to be located in this area, resulting in inaccurate measurements. In addition, backpressure would also be a problem, since the diffuser elements restrict the flow of water by causing the stream to break up or cavitate.

Darley, U.S. Pat. No. 1,276,732, discloses a flow measurement device for fire hydrants which extends into the discharge orifice of a fire hydrant. The clamping arm attempts to measure the flow of the stream center. Darley does not disperse or direct the stream, nor is there any provision for the infusion of air into the stream itself.

The novel water flow measuring and dispersing device of the present invention obviates the disadvantages of the prior art and provides a highly accurate flow measurement device for fire fighting equipment such as hydrants or pumper trucks, which disperses the water stream to prevent damage to the surrounding environment. The dispersion of the water is accomplished by infusing air into the stream to diffuse the water, while at the same time avoiding the problem of backpressure which would lead to inaccurate flow measurements.

SUMMARY OF THE INVENTION

The present invention eliminates or substantially ameliorates the disadvantages encountered in the prior art through the provision of a water flow measuring and dispersing device which allows for accurate flow measurement upstream from the dispersion element prior to expansion of the stream of water. The stream is dispersed after expansion of the stream and air is infused into the stream to aid in the dispersion of the stream and to avoid the problem of backpressure which would cause inaccurate flow measurement.

The device of the present invention consists of a funnel-shaped cylindrical housing in which a neck portion of constant diameter is provided. The discharge portion forms the funnel end, and tapers outwardly from the neck portion so that the diameter of the discharge portion is greater than the diameter of the neck portion. The funnel-shaped housing may extend in a direct line from the neck portion to the discharge portion, or as in a preferred embodiment, be provided with a bend or curve in the area where the neck portion ends and begins the outward taper to define the discharge portion. The bend allows for the positioning of the device to direct the flow away from people, plants, grass or the like to prevent damage.

The neck portion is provided with a coupling element which is secured to the housing and is provided with means for securely attaching the device to the equipment to be tested or measured. In the neck portion is also provided a tapped hole for the connection of a flow measuring meter, such as a pitot tube, manometer or the like. The hole is located upstream from the taper area where the discharge portion begins, and well upstream from the dispersion element. This allows for accurate flow measurement, since the stream has not expanded at this point and is the same diameter as when it exits the hydrant or truck valve.

The discharge portion is provided with a dispersion element located in the center of the stream downstream from the point where the housing begins to taper outwardly from the neck portion. This prevents the build-up of pressure upstream or in front of the dispersion element and avoids the problem of backpressure which would affect the flow measurements. The dispersion element comprises a crossbar and a disc welded to the crossbar, positioned normal to the flow of water through the device and preferably welded to the interior of the discharge portion. The positioning of the disc and crossbar is such that the natural tendency of the water to seek relief from a confined state is enhanced as it enters the increased diameter of the discharge portion from the neck portion and expands. As the velocity of the flow of water is increased, the stream hits the disc and is forced around it. A low pressure void is created where the water cannot flow downstream or behind the disc due to the velocity of the water around the disc. This low pressure void results in the phenomenon of air being infused into the stream to occupy the void downstream or behind the disc. This further disperses the stream, and decreases the chance of the occurrence of backpressure upstream or in front of the disc.

Accordingly, it is an object of the present invention to provide a highly accurate flow measuring and dispersion device for fire fighting equipment which avoids the problem of backpressure which may adversely affect measurements.

It is a further object of the present invention to provide a flow measuring and dispersing device which measures water pressure and flow rate before expansion of the water stream.

It is still a further object of the present invention to provide a flow measuring and dispersion device which disperses the stream by providing a dispersion element which creates an infusion of air into the stream to aid in the dispersion.

It is yet another object of the present invention to provide a flow measuring and dispersion device which is rotatable to control the direction of the flow of water.

BRIEF DESCRIPTION OF THE DRAWINGS

The foregoing objects and other features of the invention will become more readily apparent and may be understood by referring to the following detailed description of an illustrative embodiment of the water flow measuring and dispersing device of the present invention, taken in conjunction with the accompanying drawings, in which.

DETAILED DESCRIPTION OF THE PREFERRED EMBODIMENTS

Figure 1:
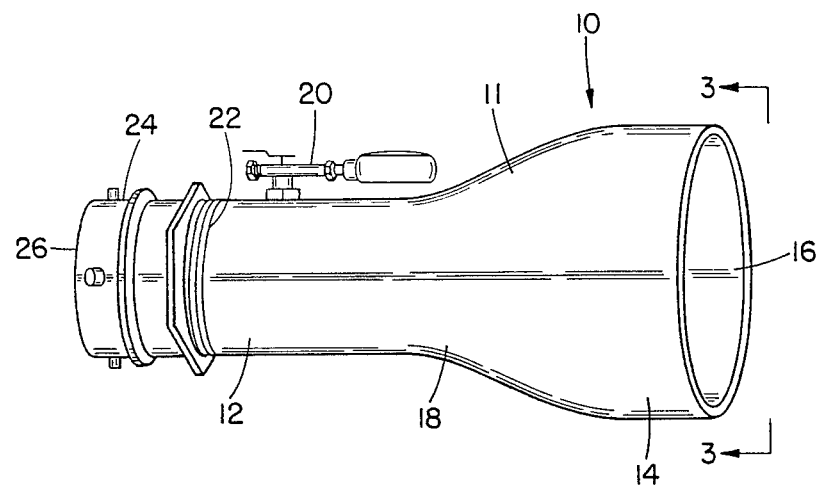
FIG. 1 illustrates a perspective view of the device of the present invention.

Referring now in specific detail to the drawings, in which identical reference numerals identify similar or identical elements throughout the several views, FIG. 1 shows a preferred embodiment of the water flow measuring and dispersing device. The device 10 is provided with a funnel-shaped housing 11 which is constructed preferably of steel casting. Housing 11 consists of neck portion 12 and discharge portion 14, discharge portion 14 being provided with outlet opening 16 for discharging water passing through device 10. Housing 11 tapers outwardly at 18 so that the diameter at discharge portion 14 is greater than the diameter at neck portion 12. A bend in housing 11 may be provided at 18 to allow for directing of the water flow.

Neck portion 12 is secured to a coupling section 24 by means of threads 22 on housing 11. Threads 22 may, of course, be eliminated if an alternate means of securement is used, such as welding. Inlet 26 is provided with internal threads for securing device 10 to a hydrant or pump truck. Neck portion 12 is also provided with a flow measuring meter 20, such as a pitot tube, manometer, or the like. Meter 20 is positioned in a tapped hole in housing 11 at a point where the diameter of the neck portion 12 is constant and substantially the diameter as the outlet on the hydrant or pump truck, so that accuracy of measuring is ensured.

Figure 2:
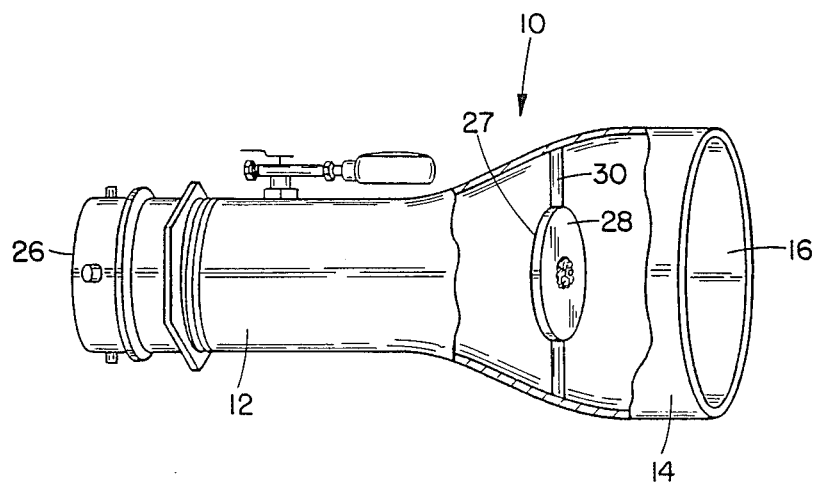
FIG. 2 illustrates the device of FIG. 1 with a partial cut-away view of the housing to show the dispersing element.
Figure 3:
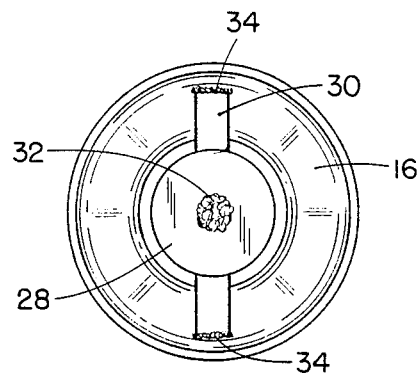
FIG. 3 illustrates the device of FIG. 1 along lines 3—3 of FIG. 1.

As seen in FIGS. 2 and 3, discharge portion 14 is provided with a water dispersion element 27 to disperse the flow of water. Dispersion element 27 comprises a disc 28 and a cylindrical crossbar 30. Disc 28 and crossbar 30 are preferably made of steel, and disc 28 is welded at 32 to crossbar 30. Crossbar 30 is in turn welded to discharge portion 14 of housing 11 at 34, as shown in FIG. 3. Disc 28 and crossbar 30 are preferably of heavy construction to prevent damage due to objects in the water stream, such as rocks. Element 27 is preferably positioned at a point in discharge portion 14 where the internal capacity of the housing 11 is between 3 and 5 times greater than the internal capacity in housing 11 at neck portion 12, preferably at a point 4 times greater. This is to prevent backpressure into the neck portion 12 which would adversely affect measurements made by meter 20.

Figure 4:
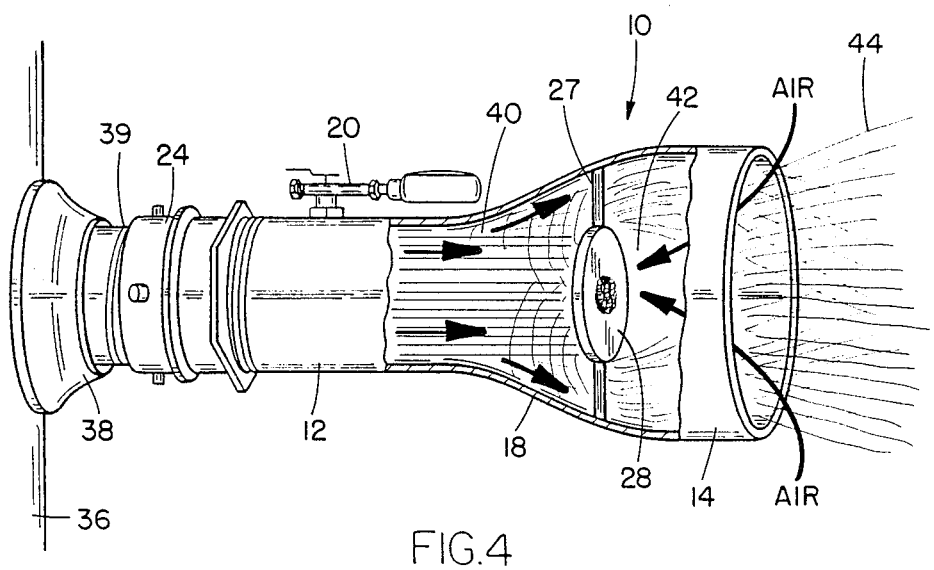
FIG. 4 illustrates the device of FIG. 1 with a partial cut-away as shown in FIG. 2, but with the device connected to a piece of fire fighting equipment such as a hydrant, with water flowing through the device.

FIG. 4 shows device 10 in use and shows how the dispersion of the water stream is enhanced by the element 27 which causes infusion of air into the stream. Device 10 is connected to a piece of fire fighting equipment, generally indicated at 36, by connecting coupling 24 to the equipment 36 at outlet 38 which is provided with threads 39.

Water stream 40 passes through device 10 and is accurately measured by meter 20 since the diameter of the stream 40 is constant from outlet 3 through neck portion 12. As stream 40 enters discharge portion 14, it meets element 27 and is dispersed by disc 28. Backpressure is avoided, since there is spacing in the flow path of stream 40 from the neck portion 12 until it reaches element 27 by means of outward taper area 18. As the velocity of the stream 40 is increased, it passes around disc 28 and creates a low pressure void 42. Naturally, this void 42 must be physically occupied, and the result is the phenomenon of air infusion as shown. The infusion of air results in further dispersion of stream 40, as shown at 44, and reduces any damage to the surrounding environment by increasing the radial and circumferential area of the stream.

The water flow measuring and dispersing device of the present invention is a highly accurate means for measuring water flow characteristics of fire fighting equipment while efficiently dispersing the stream to prevent damage to the surrounding environment by infusing air into the stream of water. Variations such as a bend in the housing and a rotatable coupling are contemplated, and it is desired that the invention not be limited to the illustrated embodiment.

While the invention has been particularly shown and described with reference to the preferred embodiments, it will be understood by those skilled in the art that various modifications and changes in form and detail may be made therein without departing from the scope and spirit of the invention. Accordingly, modifications such as those suggested above, but not limited thereto, are to be considered within the scope of the invention.

What is claimed is:

1. A water flow measuring and dispersing device for diffusing and directing water flow from the outlet of a water source, comprising:
    a funnel-shaped cylindrical housing having an open neck portion at one end extending a distance of the length of said device and tapering outwardly at an open discharge portion opposite said neck portion,
    collar means at said neck portion for rotatably connecting said housing to a water source,
    dispersion means to disperse water flowing through said device located in the interior of said housing in said discharge portion intermediate said neck portion and an open end of said discharge portion, said dispersion means comprising a rod diametrically secured to the interior of said housing at said discharge portion and a solid disc secured to said rod normal to the flow path of water flowing through said device; and
    flow measuring means located in said neck portion of said housing for measuring flow characteristics of water flowing through said housing,
    whereby said neck portion has substantially the same diameter along its length as said water source outlet.

2. A water flow measuring and dispersing device according to claim 1, wherein said neck portion has an inner diameter less than the inner diameter of said discharge portion.

3. A water flow measuring and dispersing device according to claim 1, wherein said housing bends at said neck portion at a point between said discharge portion and said collar means, so that discharge of said water flow may be controlled and directed.

4. A water flow measuring and dispersing device according to claim 3, wherein said collar means comprises a coupling for securing said housing to said water source outlet, said collar being rotatable for positioning said housing to control and direct said water flow.

5. A water flow measuring and dispersing device according to claim 1, wherein said water source outlet comprises fire-fighting equipment such as a hydrant or firetruck pump.

6. A water flow measuring and dispersing device according to claim 1, wherein said dispersion means is positioned at a point in said discharge portion where the volume of internal water capacity is between 3 and 5 times greater than the volume of internal water capacity in the neck position.

7. A water flow measuring and dispersing device according to claim 6, wherein said dispersion means is positioned at a point in said discharge portion where the volume of internal water capacity is four times greater than volume of internal water capacity in the neck portion.

8. A water flow measuring and dispersing device according to claim 6, wherein said dispersion means cause air to infuse into said water stream by creating a void in said stream at a position downstream from said disc which results from the rapid flow of said stream around said disc.

* * * * *